United States Patent [19]

Terada

[11] 4,132,447
[45] Jan. 2, 1979

[54] HINGE FITTING FOR ADJUSTABLE VEHICLE SEAT

[75] Inventor: Takami Terada, Toyota, Japan

[73] Assignee: Aisin Seiki Kabushiki Kaisha, Aichi, Japan

[21] Appl. No.: 823,453

[22] Filed: Aug. 10, 1977

[30] Foreign Application Priority Data

Aug. 30, 1976 [JP] Japan ............................ 51-103384

[51] Int. Cl.² ........................................... A47C 1/025
[52] U.S. Cl. ................................... 297/367; 297/379
[58] Field of Search ............... 297/378, 379, 366, 367, 297/354, 355; 16/143, 146, 140

[56] References Cited

U.S. PATENT DOCUMENTS

| 3,079,199 | 2/1963 | Tischler | 297/367 |
| 3,866,270 | 2/1975 | Suzuki et al. | 297/379 X |
| 3,973,288 | 8/1976 | Pickles | 297/379 X |

FOREIGN PATENT DOCUMENTS 629551  10/1961  Canada ..................................... 297/379

*Primary Examiner*—James T. McCall
*Assistant Examiner*—William E. Lyddane

*Attorney, Agent, or Firm*—Oblon, Fisher, Spivak, McClelland & Maier

[57] ABSTRACT

A hinge fitting for an adjustable vehicle seat includes a seat bracket fixedly secured to a seat and provided with a plurality of notches thereon, a back rest bracket fixedly secured to a back rest, a link member rotatably mounted on the seat bracket at one end thereof through a first pivot pin and rotatably mounting the back rest bracket at the other end thereof through a second pivot pin, respectively, a first pin selectively engageable with one of the plurality of notches and for restricting rotation of the link member about the first pivot pin relative to the seat bracket, a second pin for independently rotating the back rest bracket about the second pivot pin relative to the link member upon folding the back rest on the seat and for integrally rotating the back rest bracket and the link member upon rearwardly tilting the back rest, a handle lever rotatably supported about the first pivot pin for disengaging the first pin from one of the plurality of notches, and a connecting member for disengaging the first pin from one of the plurality of notches according to the rotation of the handle lever and for disengaging from the second pin upon folding the back rest on the seat.

10 Claims, 8 Drawing Figures

HINGE FITTING FOR ADJUSTABLE VEHICLE SEAT

BACKGROUND OF THE INVENTION

1. Field of the Invention

This invention relates to a hinge fitting for an adjustable vehicle seat which may adjust degrees of inclination of a back rest relative to a seat, and more particularly to a hinge fitting for an adjustable vehicle seat wherein the back rest may be horizontally inclined relative to the seat.

2. Description of the Prior Art

Conventional devices can provide forward inclination of a back rest through an angle of about 45° since the back rest and seat are pivotably mounted on a single pivotable means, so that ingress is prohibited by such smaller angle of inclination for a long piece of luggage or the like which may extend throughout almost the entire length of the space of the vehicle body.

The present invention is therefore provided to eliminate the above drawback of seats currently in use for vehicles.

SUMMARY OF THE INVENTION

Accordingly, it is an object of the present invention to provide an additional pivotable means other than that by which the back rest is pivotally mounted on the seat frame in a conventional manner such that inclination of the back rest is adjusted through an angle of about 45°. An additional or second pivotable means is located slightly above the conventional pivotable means and enables the back rest to be forwardly tilted down into a horizontally folded position on the seat so as to allow for larger luggage, or the like.

A further object of the invention is to provide means for beneficially connecting the second pivot to the currently used inclination adjusting mechanisms is order to effect the horizontally tilted position of the back rest and being effective to restrict associating parts to a necessary minimum number with convenience being ensured for the operator.

BRIEF DESCRIPTION OF THE DRAWINGS

The accompanying drawings, which are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
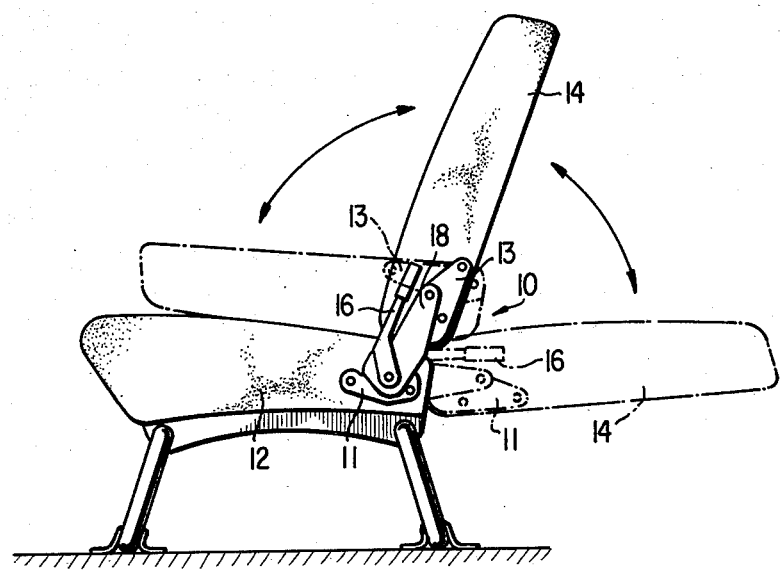
FIG. 1 is an explanatory view of operation according to the invention.
Figure 3:
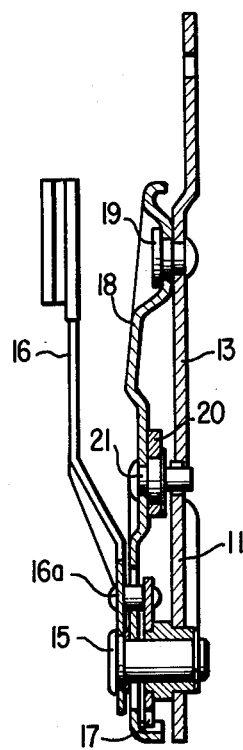
FIG. 3 is a cross sectional view taken along the line III—III in FIG. 2.

Referring now to the drawings, the reference numeral 10 generally designates a seat reclining device according to the invention. A seat bracket 11 is secured by means of bolts to a seat 12 on the floor of the vehicle. A back rest bracket 13 is secured to a back rest 14 by means of bolts. The numeral 15 designates a common pivoting pin protruding from the seat bracket 11 for commonly pivoting a handle lever 16, a cam plate 17 and a link or middle connecting member 18. The link member 18 is further in vertically movable relation with the common pin 15 along an elongated hole 18a therein, as shown in dotted line in FIG. 2 at the bottom.

The bracket 13 of the back rest 14 is pivoted to the link member 18 by means of a pin 19. To the link 18 is further pivoted another connecting member 20 by means of a pin 21. The connecting member 20 is normally urged to rotate in a clockwise direction by a coiled spring 23 anchored at both ends thereof to the connecting member 20 and the cam plate 17 at both engaging portions thereof (not numbered). The spring 23 normally urges a cam portion 17a of the cam plate 17 so as to engage the cam portion 17a of the cam plate 17 with a flange portion 18b formed on the outer surface of the link member 18 to thereby surely engaging the pin 21 with one of the notches 11a to 11c formed on the outer surface of the seat bracket 11 and also urges an arcuate recess 20a recessed on the connecting member 20 so as to engage the arcuate recess 20a with a pin 13a mounted on the back rest bracket 13.

The handle lever 16 has a pin 16a which is fixedly inserted into a hole 17b of cam plate 17 so as to freely pass through a large arcuate hole 18c of the link member 18 and is operatively connected to the cam plate 17. The handle lever 16 and the cam plate 17 are integrally rotated about the pin 15 with respect to each other so that the handle lever 16 and the cam plate 17 are normally urged by the spring 23 to rotate into the counterclockwise direction until pin 16a of the handle lever 16 abuts against the end of the arcuate hole 18c as will be seen in FIG. 2. The cam portion 17a of the cam plate 17 is released from the flange portion 18b of the link member 18 and is engaged with a pin 18d mounted on the link member 18 upon rotating the handle lever 16 in a clockwise direction.

The connecting member 20 is formed with a lug 20b which engages a projection 11d of the bracket 11 located in the path of the lug when the member turns around the pin 15 through the link 18. FIGS. 4a–4e show the above-discussed structural elements prior to assembly.

Figure 2:
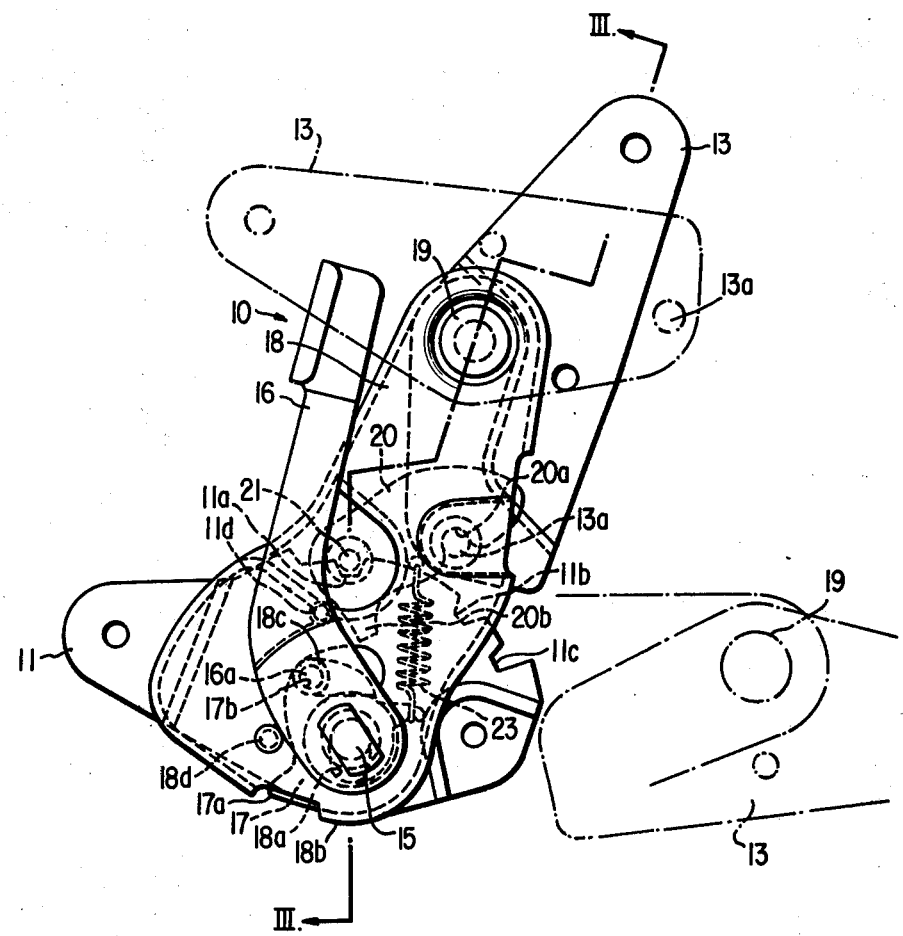
FIG. 2 is a view showing an embodiment according to the invention.
Figure 4A:
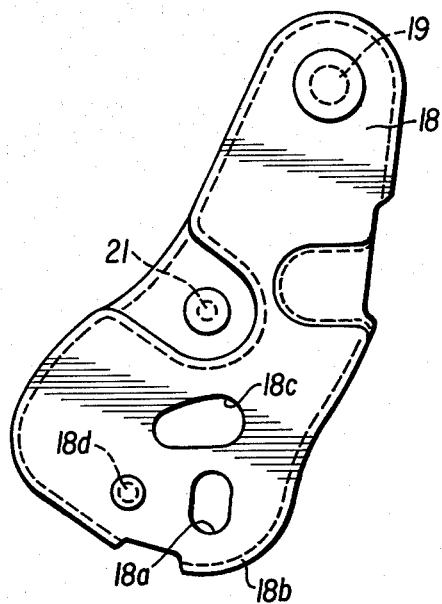
FIGS. 4a–4e show various elements of the embodiment of FIG. 2.
Figure 4B:
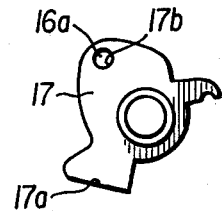
Figure 4C:
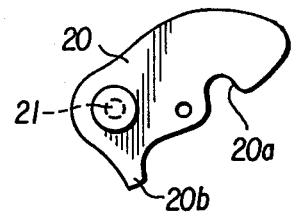
Figure 4D:
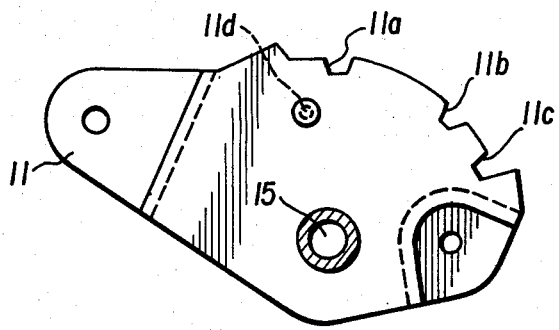
Figure 4E:
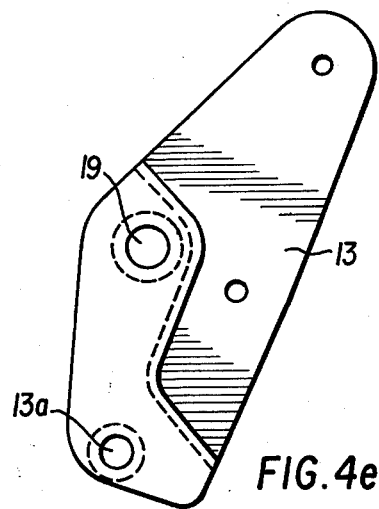

The operation according to the present invention will now be described in detail:

In the position shown in solid lines in FIG. 2, all the members occupy their usual positions to hold the back rest 14 in the vertically standing position as shown in FIG. 1. In this position, the pin 21 is engaged with the notch 11a of the seat bracket 11 so that the link member 18 is locked at the solid line position in FIG. 2 and the arcuate recess 20a of the connecting member 20 is engaged with the pin 13a of the back rest bracket 13. The spring 23 is of sufficient strength to ensure the position of the back rest 14 against any strike applied by the front or rear seat passenger under considerable inertial force, through the engagement of the pins 21 and 13a with the notch 11a and the recess 20a.

In case of the inclination of the back rest 14 is rearwardly adjusted, or rearwardly altered to a different inclination, the handle lever 16 is rotated in a clockwise direction around the pin 15. Accordingly, the cam plate 17 is integrally rotated with the handle lever 16 about the pin 15 by means of the pin 16a against the urging force of the spring 23. The cam portion 17a of the cam plate 17 is released from the flange portion 18b of the link member 18 and is engaged with the pin 18d of the link member 18 according to the rotation of the handle lever 16. Further rotation of the handle lever 16 causes the cam portion 17a of the cam plate 17 to lift the link member 18 upwardly through a distance determined by the vertically elongated hole 18a of link member 18.

The upward movement of the link member 18 causes the pin 21 to disengage from the notch 11a of the seat bracket 11 so that the link member 18 is freed to rotate around the pin 15 together with the back rest bracket 13. As a result the back rest 14 is also freed to rotate about the pin 15 in order to adjust the inclination through a desired angle. Upon release of the handle lever 16, the spring 23 causes the link member 18 to be lowered to restore the solid line position in FIG. 2 and the handle lever 16 to restore the solid line position shown, with the pin 21 engaging one of the other notches 11b and 11c of the seat bracket 11. The desired adjustment of the inclination is thus completed. It should be noted that the arcuate recess 20a of the connecting member 20 is held in engagement with the pin 13a of the back rest bracket 13 during the abovementioned operation so that the back rest 14, back rest bracket 13 and the link member 18 are rotated as a unit about the pin 15 to attain adjustment of the back rest. In the case of the pin 21 being engaged with the notch 11c of the seat bracket 11, the back rest 14 is horizontally tilted as shown in chain-dotted line in FIGS. 1, 2.

In order to forwardly tilt the back rest 14 into folded position on the seat 12, the handle lever 16 is rotated into the clockwise direction in the same manner as described above. The cam plate 17 is integrally rotated with the handle lever 16 about the pin 15 by means of the pin 16a so as to engage the cam portion 17a of the cam plate 17 with the pin 18d of the link member 18 and is upwardly lifted. Further rotation of the handle lever 16 causes the cam portion 17a of the cam plate 17 to lift the link member 18 upwardly through a distance determined by the vertically elongated hole 18a of link member 18. The pin 21 is accordingly disengaged from the notch 11a of the seat bracket 11 to thereby have the link member freed to rotate around the pin 15. The back rest 14 is then permitted to forwardly tilt as a unit with the link member 18. During the tilting of the link member 18, the lug 20b of the connecting member 20 is engaged with the pin 11d of the seat bracket 11 and continued tilting operation of the link member 18 causes the connecting member 20 to rotate in a counterclockwise direction around the pin 21 until recess 20a of the connecting member 20 is disengaged from pin 13a of the bracket. The back rest bracket 13 is thereafter free to rotate around the pivot pin 19 on the link member 18 into a position shown in FIGS. 1, 2 so that the back rest 14 is together tilted forwardly into the horizontally folded position on the seat 12 as shown in FIG. 1 in chain-dotted line. In the horizontally folded position of the back 14, ingress of any luggage almost as long as the entire length of a vehicle space is permitted readily by the front passenger seat and the neighboring rear seat.

During the period of time in which the seat back 14 is folded on the seat 12, the pin 21 is seated on the left end marginal portion of the bracket 11 neighboring the notch 11a of the seat bracket 11 so that continued depression by the operator is not necessary for the handle lever 16.

Operation of the device when the usual upright position of the back rest 14 is recovered from the horizontally folded position, will be readily understood by tracing inversely the above description.

As described above, the present invention is characterized by the provision of the second pivot pin 19 for the back rest 14 by which the back rest 14 is additionally tilted forwardly into the horizontally folded position on the seat. Such folded position is attained by handling a single common lever 16 which is also used for horizontal rearward adjustment of inclination of the back rest 14. These are effective to provide superior handling characteristics of the device and simpler arrangement to permit ready ingress of the longer luggage.

Obviously, many modifications and variations of the present invention are possible in light of the above teachings. It is to be uderstood, therefore, that within the scope of the appended claims the present invention may be practiced otherwise than as specifically described herein.

What is claimed as new and desired to be secured by Letters Patent of the United States is:

1. A hinge fitting for an adjustable vehicle seat having a seat and a back rest, comprising:
   a seat bracket fixedly secured to said seat and provided with a plurality of notch means thereon;
   a back rest bracket fixedly secured to said back rest;
   a link member rotatably mounted on said seat bracket at one end thereof through first pivot and rotatably mounting said back rest bracket at the other end thereof through second pivot means, respectively;
   first means mounted on said link member selectively engageable with one of said plurality of notch means and for restricting rotation of said link member about said first pivot means relative to said seat bracket;
   second means mounted on said back rest bracket for permitting rotation of said back rest bracket about said second pivot means relative to said link member upon folding said back rest on said seat and for integrally rotating said back rest and said link member upon rearwardly tilting said back rest;
   a handle rotatably supported about said first pivot means for disengaging said first means from one of said plurality of notch means; and
   a connecting member rotatably mounted on said link member at one end thereof through said first means and engageable with said second means at the other end disengageable from said second means upon folding said back rest on said seat subsequent to disengagement of said first means from one of said plurality of notch means according to the rotation of said handle lever.
   thereby allowing forward folding of said back rest on said seat and also rearward tiltable adjustment of said back rest.

2. A hinge fitting according to claim 1, further comprising:
   a cam plate member integrally rotatable with said handle lever and provided with a cam portion to be cooperated with said handle lever.

3. A hinge fitting according to claim 2, wherein the link member is provided with a pin engageable with said cam portion of cam plate member according to the rotation of said handle lever so as to disengage said first means from one of said plurality of notch means.

4. A hinge fitting according to claim 2, wherein said link member is further provided with a flange portion disengageable from said cam portion of cam plate member according to the rotation of said handle lever.

5. A hinge fitting according to claim 3, wherein said link member is provided with a vertically elongated hole for guiding said link member so as to disengage said first means from one of said plurality of notch means according to the rotation of said handle lever.

6. A hinge fitting according to claim 4, wherein said connecting member is provided with a recessed portion engageable with said second means and a lug portion engageable with said seat bracket, said second means being disengageable from said recessed portion upon disengaging said first means from one of said plurality of notch means and upon forward tilting of said back rest.

7. A hinge fitting according to claim 6, wherein said seat bracket is provided with a pin engageable with said lug portion of said connecting member.

8. A hinge fitting according to claim 6, further comprising:
   spring means engaged with said connecting member at one end thereof for engaging said second means with said recessed portion and with said cam plate member at the other end thereof for engaging said cam portion with said flange portion.

9. A hinge fitting according to claim 1, wherein said first means is a pin mounted on said link member.

10. A hinge fitting according to claim 1, wherein said second means is a pin mounted on said back rest bracket.

* * * * *